(12) United States Patent
Francis et al.

(10) Patent No.: US 7,491,267 B2
(45) Date of Patent: Feb. 17, 2009

(54) COMPOSITE MATERIALS AND METHODS OF MAKING AND USING SUCH COMPOSITE MATERIALS

(75) Inventors: Larry J. Francis, Wake, VA (US); W. W. Phil Robinson, Richmond, VA (US); Michael A. Riley, Towson, MD (US); Timothy Langan, Baltimore, MD (US); Morteza Aghaebrahim, Richmond, VA (US)

(73) Assignee: Ceratech, Inc., Baltimore, MD (US)

( * ) Notice: Subject to any disclaimer, the term of this patent is extended or adjusted under 35 U.S.C. 154(b) by 0 days.

(21) Appl. No.: 10/201,131

(22) Filed: Jul. 23, 2002

(65) Prior Publication Data

US 2003/0131759 A1 Jul. 17, 2003

Related U.S. Application Data

(60) Provisional application No. 60/311,529, filed on Aug. 10, 2001.

(51) Int. Cl.
*C04B 9/04* (2006.01)
*C04B 12/02* (2006.01)

(52) U.S. Cl. .................. 106/690; 106/691; 106/801; 106/DIG. 1; 501/111

(58) Field of Classification Search .............. 501/111; 106/DIG. 1, 690, 691, 801
See application file for complete search history.

(56) References Cited

U.S. PATENT DOCUMENTS

| | | | |
|---|---|---|---|
| 2,391,493 A * | 12/1945 | Wainer et al. ............ | 106/690 |
| 2,687,967 A | 8/1954 | Yedlick et al. | |
| 3,078,186 A | 2/1963 | Tierney | |
| 3,093,593 A | 6/1963 | Arrance | |
| 3,357,843 A | 12/1967 | Bowman | |
| 3,383,228 A | 5/1968 | Rekate et al. | |
| 3,392,037 A | 7/1968 | Neely et al. | |
| 3,540,897 A | 11/1970 | Martinet | |
| 3,647,488 A * | 3/1972 | Brigham et al. ............ | 106/35 |

(Continued)

FOREIGN PATENT DOCUMENTS

BR 9405303 9/1995

(Continued)

OTHER PUBLICATIONS

CA 78:88360, "Waste Solidification Program, Evaluation of Solidified Waste Products," Nuclear Science abstract, 26(23). (No month) 1972.

(Continued)

*Primary Examiner*—Paul Marcantoni
(74) *Attorney, Agent, or Firm*—Alan G. Towner, Esq.; Pietragallo Gordon Alfano Bosick & Raspanti, LLP

(57) ABSTRACT

Composite materials made from reactive compounds such as oxides are disclosed. The materials comprise a reaction producing of metal oxide, phosphate and reactive residual materials. The metal oxide may comprise MgO, CaO, ZnO, $TiO_2$ or the like. The phosphate may comprise mono-potassium phosphate, mono-ammonium phosphate, mono-sodium phosphate or the like. The reactive residual material may be ash, phosphate clay, phosphate residual slurry, mining waste or the like. The composite materials may be used for many applications including rapid repair materials, pre-cast structures, in-situ structures, mixes and coatings.

100 Claims, 6 Drawing Sheets

U.S. PATENT DOCUMENTS

| | | | |
|---|---|---|---|
| 3,821,006 A * | 6/1974 | Schwartz | |
| 3,879,209 A * | 4/1975 | Limes et al. | |
| 3,879,211 A | 4/1975 | Klotz | |
| 3,920,464 A | 11/1975 | Damiano | |
| 3,923,534 A * | 12/1975 | Cassidy | |
| 3,960,580 A | 6/1976 | Stierli et al. | |
| 3,985,567 A | 10/1976 | Iwu | |
| 4,003,752 A * | 1/1977 | Isohata et al. | |
| 4,036,655 A | 7/1977 | Yamada et al. | |
| 4,049,462 A | 9/1977 | Cocozza | |
| 4,059,455 A * | 11/1977 | Limes et al. | |
| 4,066,471 A | 1/1978 | Burke | |
| 4,160,673 A | 7/1979 | Fujita et al. | |
| 4,174,227 A * | 11/1979 | Tomic | |
| 4,275,091 A | 6/1981 | Lippits et al. | |
| 4,298,391 A | 11/1981 | Hayase et al. | |
| 4,347,325 A | 8/1982 | Michel et al. | |
| 4,351,749 A | 9/1982 | Ropp | |
| 4,355,060 A * | 10/1982 | Cornwell | 427/427 |
| 4,375,516 A | 3/1983 | Barrall | |
| 4,390,371 A * | 6/1983 | Cornwell | |
| 4,432,666 A | 2/1984 | Frey et al. | |
| 4,436,555 A | 3/1984 | Sugama et al. | |
| 4,444,594 A | 4/1984 | Paddison et al. | |
| 4,459,156 A | 7/1984 | Henslee et al. | |
| 4,460,500 A | 7/1984 | Hultgren | |
| 4,504,555 A | 3/1985 | Prior et al. | |
| 4,620,947 A | 11/1986 | Carlson | |
| 4,756,762 A * | 7/1988 | Weill et al. | 106/DIG. 1 |
| 4,758,278 A * | 7/1988 | Tomic | |
| 4,786,328 A * | 11/1988 | Weill et al. | 106/691 |
| 4,792,359 A | 12/1988 | Barrall et al. | |
| 4,836,854 A * | 6/1989 | Bierman et al. | |
| 4,843,044 A * | 6/1989 | Neville et al. | 501/111 |
| 4,872,912 A | 10/1989 | Barrall et al. | |
| 4,921,536 A | 5/1990 | Rechter | |
| 4,939,033 A | 7/1990 | Daussan et al. | |
| 4,956,321 A | 9/1990 | Barrall | |
| RE33,366 E | 10/1990 | Barrall | |
| 4,978,642 A | 12/1990 | Barrall | |
| 5,002,610 A | 3/1991 | Sherif et al. | |
| 5,037,479 A | 8/1991 | Stanforth | |
| 5,198,190 A | 3/1993 | Philipp et al. | |
| 5,202,033 A | 4/1993 | Stanforth et al. | |
| 5,246,496 A | 9/1993 | Sugama | |
| 5,302,565 A | 4/1994 | Crowe | |
| 5,382,289 A * | 1/1995 | Bambauer et al. | 106/690 |
| 5,482,550 A | 1/1996 | Strait | |
| 5,502,268 A | 3/1996 | Côté et al. | |
| 5,518,541 A | 5/1996 | Fogel et al. | |
| 5,580,378 A | 12/1996 | Shulman | |
| 5,624,493 A | 4/1997 | Wagh et al. | |
| 5,645,518 A * | 7/1997 | Wagh et al. | 588/252 |
| 5,650,121 A | 7/1997 | Dody et al. | |
| 5,669,968 A * | 9/1997 | Kobori et al. | |
| 5,697,703 A | 12/1997 | Lucchetti | |
| 5,718,757 A | 2/1998 | Guillou et al. | |
| 5,743,842 A | 4/1998 | Wasserman et al. | |
| 5,766,337 A * | 6/1998 | Moon | 106/690 |
| 5,830,815 A * | 11/1998 | Wagh et al. | 501/155 |
| 5,846,894 A | 12/1998 | Singh et al. | |
| 5,888,292 A | 3/1999 | Tremblay | |
| 6,133,498 A * | 10/2000 | Singh et al. | 588/3 |
| 6,136,088 A * | 10/2000 | Farrington | 106/691 |
| 6,153,809 A | 11/2000 | Singh et al. | |
| 6,204,214 B1 * | 3/2001 | Singh et al. | 501/155 |
| 6,498,119 B2 | 12/2002 | Wagh et al. | |
| 6,518,212 B1 * | 2/2003 | Wagh et al. | 501/111 |
| 6,561,269 B1 | 5/2003 | Brown et al. | |
| 6,659,263 B2 | 12/2003 | Hendrickson et al. | |
| 7,204,880 B1 * | 4/2007 | Turner et al. | 106/691 |

FOREIGN PATENT DOCUMENTS

| | | |
|---|---|---|
| DE | 3831106 | 3/1990 |
| EP | 0078508 A1 | 5/1983 |
| EP | 0203485 | 12/1986 |
| EP | 0661242 | 12/1994 |
| EP | 0691314 | 1/1996 |
| EP | 0866039 A1 | 9/1998 |
| FR | 2714668 | 7/1995 |
| FR | 2742142 | 6/1997 |
| JP | 53120727 | 10/1978 |
| JP | 53120728 | 10/1978 |
| JP | 53126013 | 11/1978 |
| JP | 53126014 | 11/1978 |
| JP | 53126021 | 11/1978 |
| JP | 53126022 | 11/1978 |
| JP | 53133223 | 11/1978 |
| JP | 53139623 | 12/1978 |
| JP | 53139626 | 12/1978 |
| KR | 9507711 | 7/1995 |
| WO | WO 9635647 | 11/1996 |
| WO | WO 9721639 | 6/1997 |
| WO | WO 9856732 | 12/1998 |
| WO | WO 0024690 | 5/2000 |

OTHER PUBLICATIONS

CA 95:48562, "Solidification of Actinide-containing Wastes in a Ceramic Matrix," abstract, (No month) 1981.

Brown et al., "A New Calcium Phosphate, Water-Setting Cement," pp. 352-379 (1986).

Conner, Chemical Fixation and Solidification of Hazardous Wastes, Van Nostrand Reinhold, 1990, pp. 299-303.

Fukase et al., "Setting Reactions and Compressive Strengths of Calcium Phosphate Cements," *J. Dent. Res.*, Dec. 1990; vol. 69, No. 12.

Kingery, "Fundamental Study of Phosphate Bonding in Refractories: I, Literature Review; II, Cold-Setting Properties; III Phosphate Adsorption by Clay and Bond Migration," pp. 239-250, Aug. 1, 1950, vol. 33, No. 8.

Semler, "A Quick-Setting Wollastonite Phosphate Cement," *Ceramic Bulletin*, 1976, vol. 55, No. 11.

Sugama et al., "Calcium Phosphate Cements Prepared by Acid-Base Reaction," *J. Am. Ceram. Soc.*, Aug. 1992.

Low-Temperature-Setting Phosphate Ceramics for Mixed Waste Stabilization—Arun S. Wagh & Dileep Singh—Proceedings of Second International Symposium and Exhibition on Environmental Contamination in Central and Eastern Europe, Budapest, Hungary, Sep. 20-23, 1994, 20 pages.

Low-Temperature-Setting Phosphate Ceramics for Stabilizing DOE Problem Low-Level Mixed Waste (Part I—Material & Waste Form Development—Dileep Singh, Arun S. Wagh and Lerry Knox) and (Part II—Low-Temperature-Setting Phosphate Ceramics for Stabilizing DOE Problem Low-Level Mixed Waste (Performance Studies on Final Waste Forms—Arun S. Wagh, Dileep Singh, Manish Sutaria and Sara Kurokawa)—Proceedings of Waste Management 94 Conference, Tucson, Arizona, Feb. 17-Mar. 3, 1994, 26 pages.

Phosphate-Bonded Ceramics as Candidate Final-Waste-Form Materials—D. Singh, A.S. Wagh, J. Cunnane, M. Sutaria & S. Kurokawa—Proceedings of 96th Annual Meeting of the American Ceramic Society, Indianapolis, Indiana, Apr. 24-28, 1994, 11 pages.

Stabilization of Low Level Mixed Waste in Chemically Bonded Phosphate Ceramics—Arun S. Wagh, Dileep Singh and J. Cunnane, Spectrum 1994 "Nuclear and Hazardous Waste Management International Topical Meeting", Atlanta, Georga, Aug. 14-18, 1994, 4 pages.

\* cited by examiner

COMPOSITE MATERIALS AND METHODS OF MAKING AND USING SUCH COMPOSITE MATERIALS

CROSS REFERENCE TO RELATED APPLICATION

This application claims the benefit of U.S. Provisional Application Ser. No. 60/311,529 filed Aug. 10, 2001.

FIELD OF THE INVENTION

The present invention relates to composite materials, and more particularly relates to composite materials made from reactive compounds such as metal oxides.

BACKGROUND INFORMATION

Conventional concrete materials are typically made of Portland cement, sand, stone and water. When water is mixed with the Portland cement, an exothermic reaction occurs.

Although conventional concrete is useful for many applications, the process for making concrete must be carefully controlled. Chemical ratios of the starting materials must be adhered to strictly. Precise quantities of water must be used, and controlled temperatures for curing are required. Furthermore, extreme care must be used when bonding conventional concrete to other structures. Such critical parameters increase costs, and result in relatively long process times for many applications.

Phosphate-containing ceramics have been proposed for encapsulating residual materials. U.S. Pat. Nos. 5,645,518, 5,830,815, 5,846,894 and 6,133,498 disclose phosphate ceramics which encapsulate various types of residual materials and contaminants such as heavy metals, asbestos, ash, lumber wastes, styrofoam, cellulose fibers, tires, textile wastes, and low-level radioactive waste. The residual materials act as fill materials which are encapsulated and do not participate in the chemical reaction of the product. Such processes use high-purity reagent grade dead burned MgO. The MgO requires further processing including calcining the MgO further to reduce its reactivity, requires additional buffers, such as oxides of boron to further control MgO reactivity, requires the use of hydroxides as an added buffer, and also requires pretreatment of the MgO by wash and acid wash techniques. Reagent grade fine powder forms of phosphates are required, and liquid phosphoric acid is used to initiate acid reactions in conjunction with the dry phosphate powders. These previous approaches require strict ratio control of the reagent grade MgO and phosphates. Chemical buffers are used to control reactivity of the precise formulas. Such precise chemical formulas are extremely sensitive to temperature during field implementation.

U.S. Pat. No. 5,002,610 discloses of the use of fiber additives to magnesium phosphate cements and non-reactive fill materials in order to achieve mechanical properties desirable for construction uses similar to those of Portland cement-based concrete.

U.S. Pat. No. 6,136,088 discloses the production of a cement and/or mortar based on the reactions of water, magnesium compounds, and potassium phosphate that utilize retardants such as boron oxide, polyphosphonic acid, carboxylic acid, hydroxycarbyloxylic acid, and salts of these acids. Additives such as silica, class F fly ash, talc, clay based sand, silica fume and mixtures of these materials are used as inert fillers.

The present invention has been developed in view of the foregoing, and to address other deficiencies of the prior art.

SUMMARY OF THE INVENTION

The present invention relates to composite materials made from reactive compounds such as metal oxides. In one embodiment, at least one of the reactive compounds is provided from a residual material such as ash, phosphate clay, residual phosphate slurries, mining waste, and the like. The materials are made by mixing chemically active components, including relatively low cost waste or residual materials, to produce the desired engineering properties for a particular application.

In accordance with an embodiment of the invention, metal phosphate compounds are formed with desired characteristics by controlling reactivity of acid-based reactions of metal/phosphate compounds and sources. Such control may be achieved by varying ratios of the metal (ion) phosphate, particle size of the compounds, surface area of the components, amount of water, purity of the compounds and oxide reactivity rate. The workability, set time and strength of the composite metal-phosphate compounds may be optimized by controlling reactivity of metal/phosphate compounds and sources.

An aspect of the present invention is to provide a composite material comprising a reaction product of metal oxide, phosphate, reactive residual material and water.

Another aspect of the present invention is to provide a composite material comprising a reaction product of a magnesium-containing material, phosphate, reactive residual material and water.

A further aspect of the present invention is to provide a composite material comprising a reaction product of metal oxide, phosphate and water, wherein at least a portion of the metal oxide and/or at least a portion of the phosphate is provided from a reactive residual material.

Another aspect of the present invention is to provide a composite material comprising a reaction product of a magnesium-containing material, phosphate and water, wherein at least a portion of the magnesium-containing material and/or at least a portion of the phosphate is provided from a reactive residual material.

A further aspect of the present invention is to provide a mix for making a composite material comprising metal oxide, phosphate and reactive residual material. Alternatively, the mix may comprise a magnesium-containing material, phosphate and reactive residual material. As another alternative, the mix may comprise metal oxide and/or magnesium-containing material and/or phosphate, wherein at least a portion of one or more of these materials is provided from a reactive residual material.

Another aspect of the present invention is to provide a rapid repair material comprising a reaction product of metal oxide, phosphate, reactive residual material and water.

A further aspect of the present invention is to provide a method of making a composite material. The method comprises reacting a mixture of metal oxide, phosphate and reactive residual material. Alternatively, the method comprises reacting a magnesium-containing material, phosphate and reactive material. As another alternative, the method comprises reacting a metal oxide and phosphate, wherein at least one of the metal oxide and phosphate is provided from a reactive residual material. As a further alternative, the method comprises reacting a magnesium-containing material and phosphate, wherein at least one of the magnesium-containing material and phosphate is provided from a reactive residual material. In each case, the reaction may be initiated by adding water to the mixture of starting materials.

These and other aspects of the present invention will be more apparent from the following description.

DETAILED DESCRIPTION

The composite materials of the present invention comprise chemical binders and may also comprise reactive particulates. The binders and/or reactive particulates may be provided from residual materials. The composite is a ceramic/concrete-like material which may include ionic and/or covalent chemical bonds. The present composite materials may use residual materials such as industrial by-products. The composite materials have a high tolerance for different types of starting materials, and are relatively insensitive to wide variations in composition and processing techniques.

Figure 1:
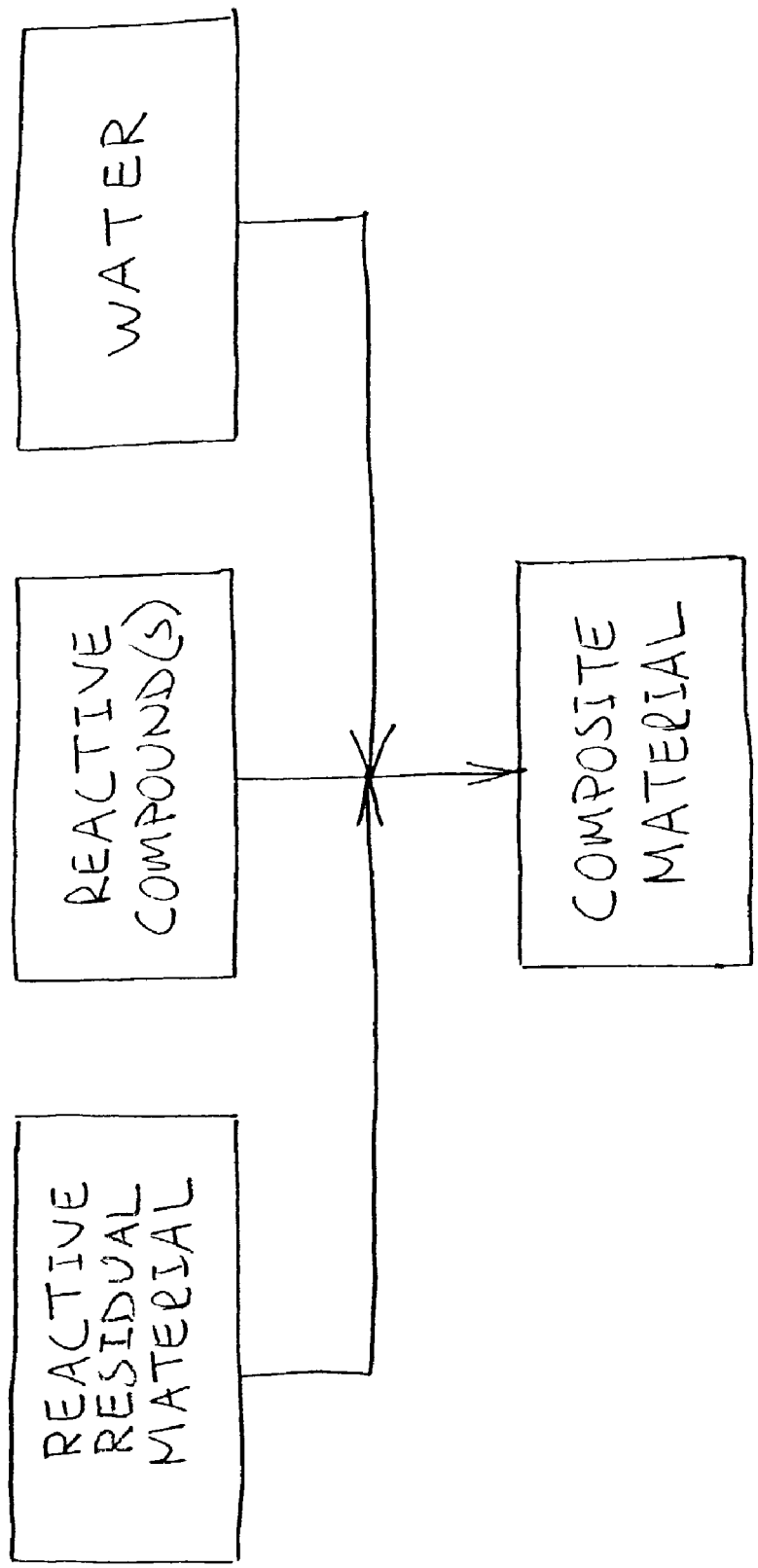
FIG. 1 is a schematic diagram illustrating a process of making a composite material in accordance with an embodiment of the present invention.

FIG. 1 is a schematic diagram illustrating a process for making a composite material in accordance with an embodiment of the present invention. As shown in FIG. 1, a reactive residual material is combined with at least one reactive compound and water, followed by reaction of the residual material and reactive compound(s) to form a composite material. In accordance with the present invention, the residual material chemically reacts with the reactive compound(s) during the composite-formation process.

As used herein, the term "reactive residual material" means residual materials that act as buffers, catalysts and/or activators, based upon their specific chemistry, and thereby contribute to the overall desired characteristics of the end product. The reactive residual material may react or chemically bond with the other starting material(s) during the present process to form chemical phases which may be determined, for example, by x-ray photoelectron spectroscopy techniques.

Suitable reactive residual materials may contain metal compounds such as metal oxides, metal hydroxides, metal halides, metal carbonates, metal nitrates, metal borates, metal sulfides, metal chromates, metal tungstates, metal molybdates, metal phosphates, metal arsenates, metal vanalydates, metal silicates, and pure metals. Suitable reactive residual materials may contain metal oxides such as $MgO$, $Al_2O_3$, $ZnO$, iron oxides, $MnO_2$, $FeTiO_3$, $MgAl_2O_4$, $ZnAl_2O_4$, and $(Zn\ Fe\ Mn)(Fe\ Mn)_2O_4$. Additional oxides include quarry fines, CCB's, wood ash, dredge materials, kaolin, ground recover glass, foundry sand, red mud, silica fines, coal fines, bauxite, volcanic ash and recycled concrete.

As a further example, suitable metal hydroxide-containing reactive residual materials may include Brucite—Mg—Mg (OH)$_2$, Manganite—MnO(OH), Gibbsite—Al(OH)$_3$, Diaspare—AlO—OH, Bachmite—AlO—OH, Geothite—FeO—OH and Bauxite.

In addition to the above-listed metal-containing reactive residual material compounds, other types of residual materials may be used in accordance with the present invention that include minerals such as Carnallite ($KM_gCl_3$—$CH_2$), Boracite ($Mg_3ClB_7O_{13}$), Epsomite ($MgSO_4.7H_2O$), Newberryite ($MgHPO_4$), Magnesite ($MgCO_3$), Olivine ($(MgFe)SiO_4$) and Dolomite ($CaMg(CO_3)_2$). In addition to the above listed metal-containing reactive residual compounds, other types of residual materials that may be used in accordance with reactive residual compounds, other types of residual materials that may be used in accordance with the present invention include calcium-containing dredge (oxides, carbonates, etc.), grain hulls and plant bark fiber.

One type of reactive residual material that may be used in accordance with the present invention comprises ash. Sources of ash reactive residual materials may include, for example, coal ash, wood ash, municipal solid waste ash (MSW), cellulosic waste ash, biosolids ash, fumes and collected particles from metal processes involving combustion. Typical sources of ash residual materials include coal-fired power plants, municipal waste furnaces and coal desulphurization residuals. Particularly suitable ash reactive residual materials include trace metal elements and/or metal oxides containing sulfur trioxide, phosphorous penta oxide, barium oxide, manganese oxide, strontium oxide, potassium oxide, aluminum oxide, iron oxide, titanium oxide, calcium oxide, magnesium oxide and sodium oxide. As a particular example, type C or F coal ash may be used.

Another type of reactive residual material that may be used in accordance with the present invention comprises phosphate compounds. For example, phosphate clays may be used as the reactive residual material. Phosphate clays typically comprised of Quartz, Dolomite, Apatite, Wavellite, Crandallite, Feldspar, Smectite, Illite, Palygorskite and Koalinite. Sources of phosphate clays include geologic sites, for example, south-central Florida.

Another type of phosphate-containing reactive residual material that may be used in accordance with the present invention is phosphate slime. Phosphate slime comprises a suspension of clays, minerals and phosphates in a liquid such as water. Typical phosphate slimes have solids contents of from about 5 to about 15 weight percent. When a phosphate slime is used as a reactive residual material in accordance with the present invention, the slime may be used directly in its as-is condition. Alternatively, the phosphate slime may be dried by removing some or all of the liquid content prior to use. Furthermore, additional liquid such as water may be added to the phosphate slime prior to use. Some sources of phosphate slime include toothpaste manufacturers, antifreeze manufacturers, motor oil producers and detergent and food processors/manufacturers. Florida phosphate and mine processing industries are examples of phosphate slime sources. In this case, the phosphate slime typically comprises a suspension of soluble and insoluble phosphates in water with a solids content of about 15 weight percent.

In addition to the above-noted types of reactive residual materials, other types of residual materials that may be used in accordance with the present invention include brake shoe dust, foundry sand, carbon black, dredge such as mining, harbor, island and manufacturing landfills. Such compounds may be provided from various industrial sources such as automotive parts manufacturers, naval shipyards, home health products manufacturers (shampoo, toothpaste, bath soap, Epsom salts), food manufacturers, beverage manufacturers, antifreeze producers and motor oil producers.

As shown in FIG. 1, in addition to the reactive residual materials, other reactive compounds such as metal oxides and phosphates are used as starting materials in accordance with the present invention. Some suitable types of reactive compounds include MgO, CaO, ZnO, $TiO_2$, $Al_2O_3$, ($SiO_2$, $KH_2(PO)_4$, $MG(OH)_2$, CaS, iron oxide (e.g., $Fe_2O_3$), $TiCl_4$, $MgSO_4$, $MnO_2$, $SCl_4$, $CaCl_2$, $CrCl_3$ and $B_2O_3$.

The selection of an appropriate reactive compound may depend upon the specific reactive residual material that is used. For example, when ash such as calcium oxide rich ash is used as the reactive residual material, the reactive compounds may include MgO, $Fe_2O_4$, $Al_2O_3$, $B_2O_3$, etc. When phosphate compounds are used as the reactive residual material, the other reactive compounds may include, for example, MgO, iron oxides, $Al_2O_3$ and/or CaO. Some examples of phosphate reactive residual materials include phosphate clays, phosphate slurries, and the like.

In accordance with an embodiment of the present invention, the composite material may comprise a reaction product of metal oxide, phosphate, reactive residual material and water. The amount of metal oxide typically ranges from about 1 to about 90 weight percent, preferably from about 10 to about 50 weight percent, based upon the total weight of the combined metal oxide, phosphate and reactive residual material. The phosphate typically comprises from about 1 to about 90 weight percent, preferably from about 10 to about 50 weight percent, based upon the total weight of the combined metal oxide, phosphate and reactive residual material. The reactive residual material typically comprises from about 0.5 to about 95 weight percent, preferably from about 5 to about 80 weight percent, based upon the total weight of the combined metal oxide, phosphate and reactive residual material. The metal oxide, phosphate and reactive residual material may optionally be mixed with from about 0.1 to about 80 weight percent filler material, preferably from about 0.5 to about 60 weight percent filler material, based upon the total solids content of the metal oxide, phosphate, reactive residual material and filler.

When MgO is used as a metal oxide in accordance with the present invention, it may have a purity of at least 10 weight percent, e.g., from about 50 to about 99 percent, typically from about 90 to 98 weight percent. The MgO typically has a particle size of about 1 inch or less. For example, the MgO particles may range from about 0.25 inch to minus 325 mesh. As a particular example, the MgO particles may be minus 30 mesh. The MgO may have a structure corresponding to its as-mined condition (no heat treatment), or may be light burned, hard burned and/or dead burned. Preferably, the MgO is hard burned or dead burned. Light burned MgO is typically subjected to a heat treatment of from 700 to 1,000° C. Hard burned MgO is typically subjected to a heat treatment of from 1,000 to 1,500° C. Dead burned MgO is typically subjected to a heat treatment of from 1,500° C. to 2,000° C.

In accordance with an embodiment of the present invention, the phosphate component of the composite material may comprise mono-potassium phosphate, mono-ammonium phosphate, mono-sodium phosphate, hexa-meta phosphate, di-potassium phosphate, di-hydrogen potassium phosphate and/or di-ammonium phosphate. Typical phosphates include mono-potassium phosphate, mono-ammonium phosphate and mono-sodium phosphate. The phosphate typically has an average particle size of about 1 inch or less. For example, the phosphate may have an average particle size of from about 0.25 inch to minus 325 mesh. As a particular example, the phosphate particles may be minus 30 mesh. The phosphate may have a purity of at least 10 percent, e.g., from about 50 to about 99 weight percent, typically from about 30 to about 85 weight percent.

The metal oxide and phosphate may have any suitable weight ratio. For some type of materials, the metal oxide to phosphate weight ratio preferably ranges from about 0.8:1 to about 2:1. For example, where the metal oxide comprises MgO and the phosphate comprises mono-potassium phosphate, the MgO:phosphate weight ratio preferably ranges from about 0.9:1 to about 1.3:1, more preferably from about 1.01:1 to about 1.15:1 for some composite materials.

As shown in FIG. 1, in addition to the reactive residual material and the additional reactive compound(s), the present composite materials are made from a liquid such as water, e.g., tap water, potable water, salt sea water, phosphate waste water and the like. Although aqueous systems are primarily described herein, it is to be understood that other liquids may be used in place of, or in addition to, water. During the mixing process, the water typically comprises from about 3 to about 30 weight percent of the mixture, preferably from about 15 to about 20 weight percent. In one embodiment, the reactive residual material typically comprises from about 15 to about 50 weight percent of the solids content of the mixture, and the additional reactive compound(s) typically comprise from about 5 to about 15 weight percent of the solids content of the mixture.

In addition to the above-listed reactive residual materials and additional reactive compound(s), the solid components of the present composite materials may further comprise materials such as recycled concrete, recovered drywall, recycled asphalt, high chloride out of specification coarse aggregates and the like. Fibers (reactive and non-reactive), e.g., metal, polymeric, glass, e-glass, graphite, etc., may also be added.

Elemental analysis was performed for some of the present materials in comparison with conventional materials. Materials reacted according to the present invention show different chemical phases than conventional materials. In accordance with an embodiment of the invention, chemical bonding of the species occurs, rather than the encapsulation of additive materials.

Chemical data is shown in Tables 1 and 2. The first set of data listed in Table 1 is based upon x-ray diffraction and shows the atomic percentages of each element present in a reacted sample made from magnesium oxide, mono-potassium phosphate and fly ash in accordance with the present invention. The second set of data listed in Table 2 was accomplished using x-ray photoelectron spectroscopy, which measures the degree of bonding and can distinguish chemical compounds. It is clear from this data that the base materials in the reaction: magnesium oxide; mono-potassium phosphate; and the fly ash (primarily aluminum oxide and silicon oxide), form very complex chemical phases in the final product. These phases of the final product are present due to the direct chemical reaction of the magnesium oxide and the mono potassium phosphate with the fly ash constituents.

TABLE 1

Atomic Concentrations of Elements on Freshly Fractured Surface of Magnesium Phosphate/Fly Ash Composite

| Element | Concentration (Atomic %) |
|---|---|
| Magnesium | 4.50 |
| Aluminum | 4.15 |
| Silicon | 6.88 |
| Phosporous | 7.21 |
| Sulfur | 0.40 |
| Carbon | 10.43 |
| Potassium | 12.96 |
| Oxygen | 53.01 |
| Zinc | 0.09 |
| Sodium | 0.16 |

TABLE 2

X-Ray Photoelectron Spectroscopy Results

| Chemical Phase | Total Atomic % |
|---|---|
| $SiO_2 \cdot 0.88K_2HPO_4 \cdot 0.58MgO \cdot 0.31Al_2O_3 \cdot 0.36H_2O$ | 68.38 |
| $K_2HPO_4 \cdot 0.87MgO \cdot 0.84SiO_2 \cdot 0.21Al_2O_3 \cdot 0.32H_2O$ | 20.42 |

The quantitative x-ray photoelectron spectroscopy results for the elemental composition of a freshly fractured surface are expected to consist primarily of the surface of the particles which were bonded together during the chemical reaction. The depth of the analysis was about 5-6 nanometers, so the particle surface composition is not expected to be the same as the average bulk composition, given the nature of the material. Two principal surface potential states were found in the high energy resolution spectra, and are shown in Table 2. The respective component oxides and phosphates belonging to these potential states are shown in Table 2. Each of these complex phases differs only in the relative proportion of its constituent oxides and potassium phosphates. The remaining material (10.42 percent) is organic and this is distributed upon the two inorganic phases in proportion to their relative concentrations.

The following Table 3 lists some examples in accordance with the present invention. The primary starting materials are listed in Table 3 as "$MO_x$" (e.g., MgO), "$AB(P_xO_y)$" (e.g., $KH_2(P_2O_4)$ or $NH_4H_2(PO_4)$), and "residuals" (e.g., coal ash, calcium-containing dredge, municipal waste ash, phosphate slime, etc.). All numbers are in grams, unless otherwise noted. Unless otherwise noted, all mixing times are approximately 5 minutes.

TABLE 3

| $MO_x$ MgO | + | $AB(P_2O_4)$ $KH_2(P_2O_4)$ | + | residuals residuals | + sand + sand | differences | compressive strength |
|---|---|---|---|---|---|---|---|
| 90g | | 78 | | 65 coal ash | 120 | 10 micron MgO | 3.5 Ksi |
| 90 | | 78 | | 65 coal ash | 120 | 40 micron MgO | 3 Ksi (90 minutes) |
| 90 | | 78 | | 65 coal ash | 120 | H3 grade MKP | 3 Ksi |
| 90 | | 78 | | 65 coal ash | 120 | low grade MgO 150 micron | 5 Ksi (3 day) |
| 90 | | 78 | | 0 | 0 | | 4 Ksi (5 days) |
| 72 | | 65 | | 130 CaO dredge | 0 | | 1 Ksi (1 hour) |
| 72 | | 65 | | 140 CaO dredge | 0 | 25 g coal ash | 1.7 Ksi (1 hour) |
| 40 | | 60 | | 100 CaO dredge | 0 | | 5 Ksi (24 hours) |
| 40 | | 60 | | 200 CaO dredge | 0 | 16% water | 6 Ksi (24 hours) |
| 40 | | 60 | | 200 CaO dredge | 30 | fine sand | 5.5 Ksi (24 hours) |
| 40 | | 60 | | 235 CaO dredge | 0 | | 6.3 Ksi (24 hours) |
| 35 | | 65 | | 295 CaO dredge | | | 2.375 Ksi (24 hours) |
| 40 | | 60 | | 300 CaO dredge | 0 | larger MgO less calcined | 3.875 Ksi (24 hours) |
| 40 | | 60 | | 200 CaO | 40 | | 6 Ksi (24 hours) |
| 76 | | 66 | | 74 coal ash | 137 | | 5.4 Ksi |
| 350 | | 250 | | 200 coal ash | 0 | | 2.5 Ksi |
| 40 | | 78 | | 85 coal ash | 0 | | 1.5 Ksi |
| 70 | | 78 | | 90 coal ash | 148 | | 2.7 Ksi (1 hour) |
| 70 | | 78 | | 80 coal ash | 158 | | 3.0 Ksi (1 hour) |
| 45 | | 39 | | 27.5 coal ash | 62 | 4.2 Boric acid | — |
| 45 | | 39 | | 27.5 coal ash | 62 | 2.1 Boric acid | — |
| 76 | | 136 | | 90 coal ash | 158 | | 2.75 Ksi (1 hour) |
| 70 | | 90 | | 60 coal ash | 135 | | 4.375 Ksi (18 hour) |
| 70 | | 90 | | 85 coal ash | 191 | | 2.5 Ksi (18 hour) |
| 40 | | 176 | | 216 coal ash | 0 | | 2.5 Ksi (24 hour) |
| 350 | | 250 | | 400 municipal waste ash | 0 | larger MgO hard burned | 6.5 Ksi (7 day) |
| 350 | | 250 | | 400 municipal waste ash | 0 | 40 coal ash | 6.3 Ksi (7 days) |
| 600 | | 400 | | phosphate slime 400 | 0 | | 2.0 Ksi (3 days) |
| 90 | | 78 | | phosphate slime 286 | 0 | no added water | 3.0 Ksi (3 days) |
| 100 | | 50 | | phosphate slime 150 | 0 | no added water | — |
| 78 | | 66 | | phosphate slime 140 | 0 | no added water 50 coal ash | 3.86 (5 days) |
| 78 | | 50 | | phosphate slime 140 | 0 | no added water 50 coal ash | 3.25 Ksi (5 days) |
| 76 | | 66 | | 100 glassflo (low alkali) −325 mesh | 0 | | 3.5 Ksi (24 hours) |
| 76 | | 66 | | 74 glassflo/137 mix color glass | | | 4.5 Ksi (24 hours) |
| 40 | | 60 | | 100 high alkali glass | | 40 minutes workability | 3 Ksi (3 day) |
| 40 | | 60 | | 75 low alkali glass | | 1 g.boric acid | 1.5 Ksi (3 day) |
| 92 | | 65 | | 75 coal ash/105 bioash | | | 2.5 Ksi (5 days) |
| 92 | | 65 | | 50 coal ash/120 bioash | | | 2.75 Ksi (5 days) |

TABLE 3-continued

| MgO | + | NH₄H₂(PO₄) | residual | sand | comments |
|---|---|---|---|---|---|
| 70 | | 78 | 85 coal ash F | 100 | 3.125 Ksi (1 hour) |
| 70 | | 78 | 85 | 130 | 3.125 Ksi (18 hours) |
| 76 | | 136 | 90 coal ash | 158 | 3.0 Ksi (1 hour) |
| 40 | | 136 | 50 | 0 | reaction study* |
| 50 | | 136 | 50 | 0 | reaction study* |
| 60 | | 136 | 50 | 0 | reaction study* |
| 70 | | 136 | 50 | 0 | reaction study* |
| 80 | | 136 | 50 | 0 | reaction study* |

*Samples prepared with agricultural grade phosphates and industrial grade MgO; materials did not work until the 80 g MgO was used.

Tables 4-10 list samples of additional materials. In the tables, the MgO designation "D-30" represents dead burned MgO −30 mesh, the MgO designation "D-325" represents dead burned MgO −325 mesh, the MgO designation "H-60" represents hard burned MgO −60 mesh, and the MgO designation "H-30" represents hard burned MgO −30 mesh. The phosphate designation "MKP" represents mono potassium phosphate, the phosphate designation "MAP" represents mono potassium phosphate, and the phosphate designation "MSP" represents mono sodium phosphate. The metal oxide, e.g., MgO, and/or the phosphate may be provided in the form of mixtures having different particle size distributions. For example, the MgO may comprise a relatively coarse particle size distribution, e.g., −30 mesh, and a relatively fine particle size distribution, e.g., −325 mesh. The "reaction time" is the time from initial mixing to the substantial completion of an exothermic reaction. "Initial set" is defined by the loss of workability. "Final set" is defined by the loss of elasticity or the start of hardening.

TABLE 4

Sample Compositions (g), Set Times (min.) and Strengths (psi)

| Sample # | MgO D-30 | MgO D-325 | MgO Total | D-30/D-325 | Phosphate MKP | Fly ash Class F | Sand | Water | Mix time | Reaction time | Initial set | Final set | 1 hr Strength | 3 hr | 24 hrs | 3 days | 7 days | 14 days |
|---|---|---|---|---|---|---|---|---|---|---|---|---|---|---|---|---|---|---|
| 1 | | 87 | 87 | 0.00 | 78 | 65 | 120 | 59.5 | 3.50 | 2.00 | 6.00 | 8.37 | | 2987 | 4725 | | | |
| 2 | 45 | 45 | 90 | 1.00 | 78 | 65 | 120 | 63.5 | 6 | 3.00 | 9.25 | 11.50 | | | 4262 | | 5150 | 5375 |
| 3 | | 90 | 90 | 0.00 | 78 | 65 | 120 | 63.5 | 3.50 | | 4.50 | 5.13 | 4125 | 4220 | 3450 | 5330 | 6030 | |
| 4 | | 87 | 87 | 0.00 | 78 | 65 | 123 | 63.5 | 3.50 | 3.00 | 5.83 | 8.75 | | 3000 | 3475 | | | |
| 5 | | 87 | 87 | 0.00 | 78 | 68 | 120 | 63.5 | 3.50 | 2.00 | 5.25 | 8.30 | | 3475 | 4000 | | | |
| 6 | 45 | 45 | 90 | 1.00 | 78 | 65 | 125 | 64.4 | 6 | 4.00 | 12.50 | 13.75 | | 3425 | | 3788 | | 3687 |
| 7 | 45 | 45 | 90 | 1.00 | 78 | 65 | 125 | 64.4 | 9 | 4.00 | 12.00 | 16.00 | | 5225 | | 5838 | | 4500 |
| 8 | | 87 | 87 | 0.00 | 78 | 68 | 125 | 64.4 | 3.50 | 2.00 | 5.00 | 7.67 | | 3812 | | | | |
| 9 | 45 | 45 | 90 | 1.00 | 78 | 68 | 125 | 65.0 | 6 | 3.00 | 10.33 | 16.00 | | 2875 | 2375 | | | |
| 10 | | 87 | 87 | 0.00 | 78 | 65 | 120 | 70.0 | 3.50 | 2.25 | 5.00 | 6.00 | 3625 | 4025 | 3750 | | 4700 | |
| 11 | 40 | 50 | 90 | 0.81 | 78 | 65 | 120 | 70.6 | 6 | 4.00 | 8.00 | 9.75 | | 3700 | | | | |
| 12 | 45 | 45 | 90 | 1.00 | 78 | 65 | 120 | 70.6 | 6.00 | 4.00 | 13.00 | 17.00 | | 3425 | 4500 | 4325 | 4737 | 5050 |
| 13 | 45 | 45 | 90 | 1.00 | 78 | 65 | 120 | 70.6 | 6.00 | 1.00 | 12.00 | 18.00 | | 2600 | 3138 | 2650 | | |
| 14 | 9 | 81 | 90 | 0.11 | 78 | 65 | 120 | 70.6 | 4.00 | 2.00 | 4.55 | 6.00 | 3350 | 4475 | | 4537 | | |
| 15 | 76 | 19 | 95 | 4.00 | 78 | 65 | 120 | 71.5 | 6 | 5.50 | 10.50 | 16.00 | | 1687 | | | | |
| 16 | 45 | 45 | 90 | 1.00 | 78 | 65 | 125 | 71.6 | 4 | 4.00 | 9.75 | 12.00 | | 2675 | 3762 | 4000 | 3815 | 3312 |
| 17 | 45 | 45 | 90 | 1.00 | 78 | 70 | 120 | 71.6 | 6.00 | 4.00 | 13.00 | 18.00 | | 3145 | 3900 | 4325 | 3350 | 5062 |
| 18 | 8.5 | 76.5 | 85 | 0.11 | 78 | 70 | 125 | 71.6 | 4.25 | 1.15 | 5.25 | 6.50 | 315 | 4225 | | 4687 | | |
| 19 | 45 | 45 | 90 | 1.00 | 78 | 68 | 125 | 72.2 | 6 | 3.00 | 11.00 | 17.00 | | 3000 | 3625 | | | |
| 20 | 45 | 45 | 90 | 1.00 | 78 | 70 | 125 | 72.6 | 6.00 | 4.00 | 14.00 | 16.00 | | 3487 | 3775 | 3900 | 4750 | 4813 |
| 21 | 45 | 45 | 90 | 1.00 | 78 | 65 | 120 | 77.6 | 6 | 2.50 | 9.66 | 12.50 | | 3425 | | 3425 | | 2625 |
| 22 | | | 90 | | 78 | 65 | 120 | 74 | 3.30 | 2.15 | 3.55 | 4.20 | | 6625 | | 9000 | 9750 | 9625 |

TABLE 5

Sample Compositions (g), Set Times (min.) and Strengths (psi)

| Sample # | MgO D-30 | MgO D-325 | MgO H-60 | MgO H-30 | MgO Other | MgO Total | Phosphate MKP | Phosphate MAP | Phosphate MSP | Phosphate Total | Fly ash Class F | Sand | Water | Mix time | Reaction time | Initial set | Final set | 3 hr Strength |
|---|---|---|---|---|---|---|---|---|---|---|---|---|---|---|---|---|---|---|
| 23 | | 176.1 | | | | 176.1 | 220.5 | | | 220.5 | 153.4 | 283.3 | 166.6 | 3.50 | 3.00 | 7.00 | 11.50 | 3000 |
| 24 | | 148.7 | | | | 148.7 | 247.9 | | | 247.9 | 153.4 | 283.3 | 166.6 | 3.50 | 5.00 | 10.00 | 16.00 | 1500 |
| 25 | | 212.5 | | | | 212.5 | 184.1 | | | 184.1 | 153.4 | 283.3 | 166.6 | 3.50 | 1.50 | 4.92 | 7.00 | 3250 |
| 26 | | 210.1 | | | | 210.1 | 186.5 | | | 186.5 | 153.4 | 283.3 | 166.6 | 3.50 | 1.58 | 5.17 | 7.42 | 3750 |
| 27 | | 207.7 | | | | 207.7 | 188.8 | | | 188.8 | 153.4 | 283.3 | 166.6 | 3.50 | 1.67 | 5.17 | 7.50 | 3438 |

TABLE 5-continued

Sample Compositions (g), Set Times (min.) and Strengths (psi)

| Sample # | MgO | | | | | | Phosphate | | | | Fly ash | | | Mix | Reaction | Initial | Final | 3 hr |
| | D-30 | D-325 | H-60 | H-30 | Other | Total | MKP | MAP | MSP | Total | Class F | Sand | Water | time | time | set | set | Strength |
|---|---|---|---|---|---|---|---|---|---|---|---|---|---|---|---|---|---|---|
| 28 | | 205.4 | | | | 205.4 | 191.2 | | | 191.2 | 153.4 | 283.3 | 166.6 | 3.50 | 1.75 | 5.33 | 7.58 | 3625 |
| 29 | | 224.1 | | | | 224.1 | 172.4 | | | 172.4 | 153.4 | 283.3 | 166.6 | 3.50 | 1.25 | 4.67 | 6.67 | 3300 |
| 30 | | 231.3 | | | | 231.3 | 165.2 | | | 165.2 | 153.4 | 283.3 | 166.6 | 3.50 | 1.00 | 4.67 | 6.25 | 2750 |
| 31 | | 198.3 | | | | 198.3 | 198.3 | | | 198.3 | 153.4 | 283.3 | 166.6 | 2.00 | 1.75 | 3.10 | | 2462 |
| 32 | | 207.7 | | | | 207.7 | 188.8 | | | 188.8 | 153.4 | 283.3 | 166.6 | 2.00 | 1.50 | 3.00 | | 2150 |
| 33 | | 212.5 | | | | 212.5 | 184.1 | | | 184.1 | 153.4 | 283.3 | 166.6 | 2.00 | 1.50 | 2.75 | | 1925 |
| 34 | | 224.2 | | | | 224.2 | 172.3 | | | 172.3 | 153.4 | 283.3 | 166.6 | 2.00 | 1.42 | 2.30 | | 1675 |
| 35 | 378.6 | 189.3 | | | | 567.9 | 554.4 | | | 554.4 | 473.3 | 946.6 | 457.7 | 8 | 4.00 | 11.45 | 20 | 3925 |
| 36 | 211.8 | | 171.3 | | | 383.1 | 365.1 | | | 365.1 | 324.5 | 622 | 305.2 | 8 | 6.05 | 15 | 28 | 4062 |
| 37 | 190 | | 31 | | | 221.0 | 221.1 | | | 221.1 | 194.7 | 363.2 | 180 | 10 | 4.3 | 25 | 62 | 2400 |
| 38 | | 131.2 | | | | 131.2 | 120.4 | | | 120.4 | 248.4 | | 120 | 3 | 2.00 | 8.2 | 14.0 | 1150 |

TABLE 6

Sample Composition Percentages (wt. %), Set Times (min.) and Strengths (psi)

| Sample # | MgO | | | | | | Phosphate | | | | Fly ash | | | Mix | Reaction | Initial | Final | 3 hr |
| | D-30 | D-325 | H-60 | H-30 | Other | Total | MKP | MAP | MSP | Total | Class F | Sand | Water | time | time | set | set | Strength |
|---|---|---|---|---|---|---|---|---|---|---|---|---|---|---|---|---|---|---|
| 23 | | 18 | | | | 18 | 22 | | | 22 | 15 | 28 | 17 | 4 | 3.00 | 7.00 | 11.50 | 3000 |
| 24 | | 15 | | | | 15 | 25 | | | 25 | 15 | 28 | 17 | 4 | 5.00 | 10.00 | 16.00 | 1500 |
| 25 | | 21 | | | | 21 | 18 | | | 18 | 15 | 28 | 17 | 4 | 1.50 | 4.92 | 7.00 | 3250 |
| 26 | | 21 | | | | 21 | 19 | | | 19 | 15 | 28 | 17 | 4 | 1.58 | 5.17 | 7.42 | 3750 |
| 27 | | 21 | | | | 21 | 19 | | | 19 | 15 | 28 | 17 | 4 | 1.67 | 5.17 | 7.50 | 3438 |
| 28 | | 21 | | | | 21 | 19 | | | 19 | 15 | 28 | 17 | 4 | 1.75 | 5.33 | 7.58 | 3625 |
| 29 | | 22 | | | | 22 | 17 | | | 17 | 15 | 28 | 17 | 4 | 1.25 | 4.67 | 6.67 | 3300 |
| 30 | | 23 | | | | 23 | 17 | | | 17 | 15 | 28 | 17 | 4 | 1.00 | 4.67 | 6.25 | 2750 |
| 31 | | 20 | | | | 20 | 20 | | | 20 | 15 | 28 | 17 | 2 | 1.75 | 3.10 | | 2462 |
| 32 | | 21 | | | | 21 | 19 | | | 19 | 15 | 28 | 17 | 2 | 1.50 | 3.00 | | 2150 |
| 33 | | 21 | | | | 21 | 18 | | | 18 | 15 | 28 | 17 | 2 | 1.50 | 2.75 | | 1925 |
| 34 | | 22 | | | | 22 | 17 | | | 17 | 15 | 28 | 17 | 2 | 1.42 | 2.30 | | 1675 |

TABLE 7

Sample Composition Weight Ratios, Set Times (min.) and Strengths (psi)

| Sample # | MgO/MKP | Cement/agg | flyash/sand | Mix time | Reaction time | Initial set | Final set | 3 hr Strength |
|---|---|---|---|---|---|---|---|---|
| 23 | 0.80 | 0.91 | 0.54 | 4 | 3.00 | 7.00 | 11.50 | 3000 |
| 24 | 0.60 | 0.91 | 0.54 | 4 | 5.00 | 10.00 | 16.00 | 1500 |
| 25 | 1.15 | 0.91 | 0.54 | 4 | 1.50 | 4.92 | 7.00 | 3250 |
| 26 | 1.13 | 0.91 | 0.54 | 4 | 1.58 | 5.17 | 7.42 | 3750 |
| 27 | 1.10 | 0.91 | 0.54 | 4 | 1.67 | 5.17 | 7.50 | 3438 |
| 28 | 1.07 | 0.91 | 0.54 | 4 | 1.75 | 5.33 | 7.58 | 3625 |
| 29 | 1.30 | 0.91 | 0.54 | 4 | 1.25 | 4.67 | 6.67 | 3300 |
| 30 | 1.40 | 0.91 | 0.54 | 4 | 1.00 | 4.67 | 6.25 | 2750 |
| 31 | 1.00 | 0.91 | 0.54 | 2 | 1.75 | 3.10 | | 2462 |
| 32 | 1.10 | 0.91 | 0.54 | 2 | 1.50 | 3.00 | | 2150 |
| 33 | 1.15 | 0.91 | 0.54 | 2 | 1.50 | 2.75 | | 1925 |
| 34 | 1.30 | 0.91 | 0.54 | 2 | 1.42 | 2.30 | | 1675 |

TABLE 8

Sample Composition Weight Ratios, Set Times and Strengths

| Sample # | MgO/MKP | Mix time | Reaction time 4 min mix | Reaction time 2 min mix | Initial set 4 min mix | Initial set 2 min mix | Final set | Strength 3 hr (psi) 4 min mix | Strength 3 hr (psi) 2 min mix |
|---|---|---|---|---|---|---|---|---|---|
| 23 | 0.80 | 4 | 3.00 | | 7.00 | | 11.50 | 3000 | |
| 24 | 0.60 | 4 | 5.00 | | 10.00 | | 16.00 | 1500 | |
| 25 | 1.15 | 4 | 1.50 | | 4.92 | | 7.00 | 3250 | |

TABLE 8-continued

Sample Composition Weight Ratios, Set Times and Strengths

| Sample # | MgO/MKP | Mix time | Reaction time 4 min mix | Reaction time 2 min mix | Initial set 4 min mix | Initial set 2 min mix | Final set | Strength 3 hr (psi) 4 min mix | Strength 3 hr (psi) 2 min mix |
|---|---|---|---|---|---|---|---|---|---|
| 26 | 1.13 | 4 | 1.58 | | 5.17 | | 7.42 | 3750 | |
| 27 | 1.10 | 4 | 1.67 | | 5.17 | | 7.50 | 3438 | |
| 28 | 1.07 | 4 | 1.75 | | 5.33 | | 7.58 | 3625 | |
| 29 | 1.30 | 4 | 1.25 | | 4.67 | | 6.67 | 3300 | |
| 30 | 1.40 | 4 | 1.00 | | 4.67 | | 6.25 | 2750 | |
| 31 | 1.00 | 2 | | 1.75 | | 3.10 | | | 2462 |
| 32 | 1.10 | 2 | | 1.50 | | 3.00 | | | 2150 |
| 33 | 1.15 | 2 | | 1.50 | | 2.75 | | | 1925 |
| 34 | 1.30 | 2 | | 1.42 | | 2.30 | | | 1675 |

TABLE 9

Sample Compositions (g), Set Times (min.) and Strengths (psi)

| Sample # | MgO D-325 (g) | Phosphate MKP (g) | Fly ash Class F (g) | Sand (g) | Water (g) | Mix time | Reaction time | Initial set | Final set | Compressive Strength after 3 hr |
|---|---|---|---|---|---|---|---|---|---|---|
| 23 | 176.1 | 220.5 | 153.4 | 283.3 | 166.6 | 3.50 | 3.00 | 7.00 | 11.50 | 3000 |
| 24 | 148.7 | 247.9 | 153.4 | 283.3 | 166.6 | 3.50 | 5.00 | 10.00 | 16.00 | 1500 |
| 25 | 212.5 | 184.1 | 153.4 | 283.3 | 166.6 | 3.50 | 1.50 | 4.92 | 7.00 | 3250 |
| 26 | 210.1 | 186.5 | 153.4 | 283.3 | 166.6 | 3.50 | 1.58 | 5.17 | 7.42 | 3750 |
| 27 | 207.7 | 188.8 | 153.4 | 283.3 | 166.6 | 3.50 | 1.67 | 5.17 | 7.50 | 3438 |
| 28 | 205.4 | 191.2 | 153.4 | 283.3 | 166.6 | 3.50 | 1.75 | 5.33 | 7.58 | 3625 |
| 29 | 224.1 | 172.4 | 153.4 | 283.3 | 166.6 | 3.50 | 1.25 | 4.67 | 6.67 | 3300 |
| 30 | 231.3 | 165.2 | 153.4 | 283.3 | 166.6 | 3.50 | 1.00 | 4.67 | 6.25 | 2750 |
| 31 | 198.3 | 198.3 | 153.4 | 283.3 | 166.6 | 2.00 | 1.75 | 3.10 | | 2462 |
| 32 | 207.7 | 188.8 | 153.4 | 283.3 | 166.6 | 2.00 | 1.50 | 3.00 | | 2150 |
| 33 | 212.5 | 184.1 | 153.4 | 283.3 | 166.6 | 2.00 | 1.50 | 2.75 | | 1925 |
| 34 | 224.2 | 172.3 | 153.4 | 283.3 | 166.6 | 2.00 | 1.42 | 2.30 | | 1675 |

TABLE 10

Sample Composition Weight Percentages, Set Times (min.) and Strengths (psi)

| Sample # | MgO D-325 (wt %) | Phosphate MKP (wt %) | Fly ash Class F (wt %) | Sand (wt %) | Water (wt %) | Mix time | Reaction time | Initial set | Final set | 3 hr Strength |
|---|---|---|---|---|---|---|---|---|---|---|
| 23 | 18 | 22 | 15 | 28 | 17 | 4 | 3.00 | 7.00 | 11.50 | 3000 |
| 24 | 15 | 25 | 15 | 28 | 17 | 4 | 5.00 | 10.00 | 16.00 | 1500 |
| 25 | 21 | 18 | 15 | 28 | 17 | 4 | 1.50 | 4.92 | 7.00 | 3250 |
| 26 | 21 | 19 | 15 | 28 | 17 | 4 | 1.58 | 5.17 | 7.42 | 3750 |
| 27 | 21 | 19 | 15 | 28 | 17 | 4 | 1.67 | 5.17 | 7.50 | 3438 |
| 28 | 21 | 19 | 15 | 28 | 17 | 4 | 1.75 | 5.33 | 7.58 | 3625 |
| 29 | 22 | 17 | 15 | 28 | 17 | 4 | 1.25 | 4.67 | 6.67 | 3300 |
| 30 | 23 | 17 | 15 | 28 | 17 | 4 | 1.00 | 4.67 | 6.25 | 2750 |
| 31 | 20 | 20 | 15 | 28 | 17 | 2 | 1.75 | 3.10 | | 2462 |
| 32 | 21 | 19 | 15 | 28 | 17 | 2 | 1.50 | 3.00 | | 2150 |
| 33 | 21 | 18 | 15 | 28 | 17 | 2 | 1.50 | 2.75 | | 1925 |
| 34 | 22 | 17 | 15 | 28 | 17 | 2 | 1.42 | 2.30 | | 1675 |

Figure 2:
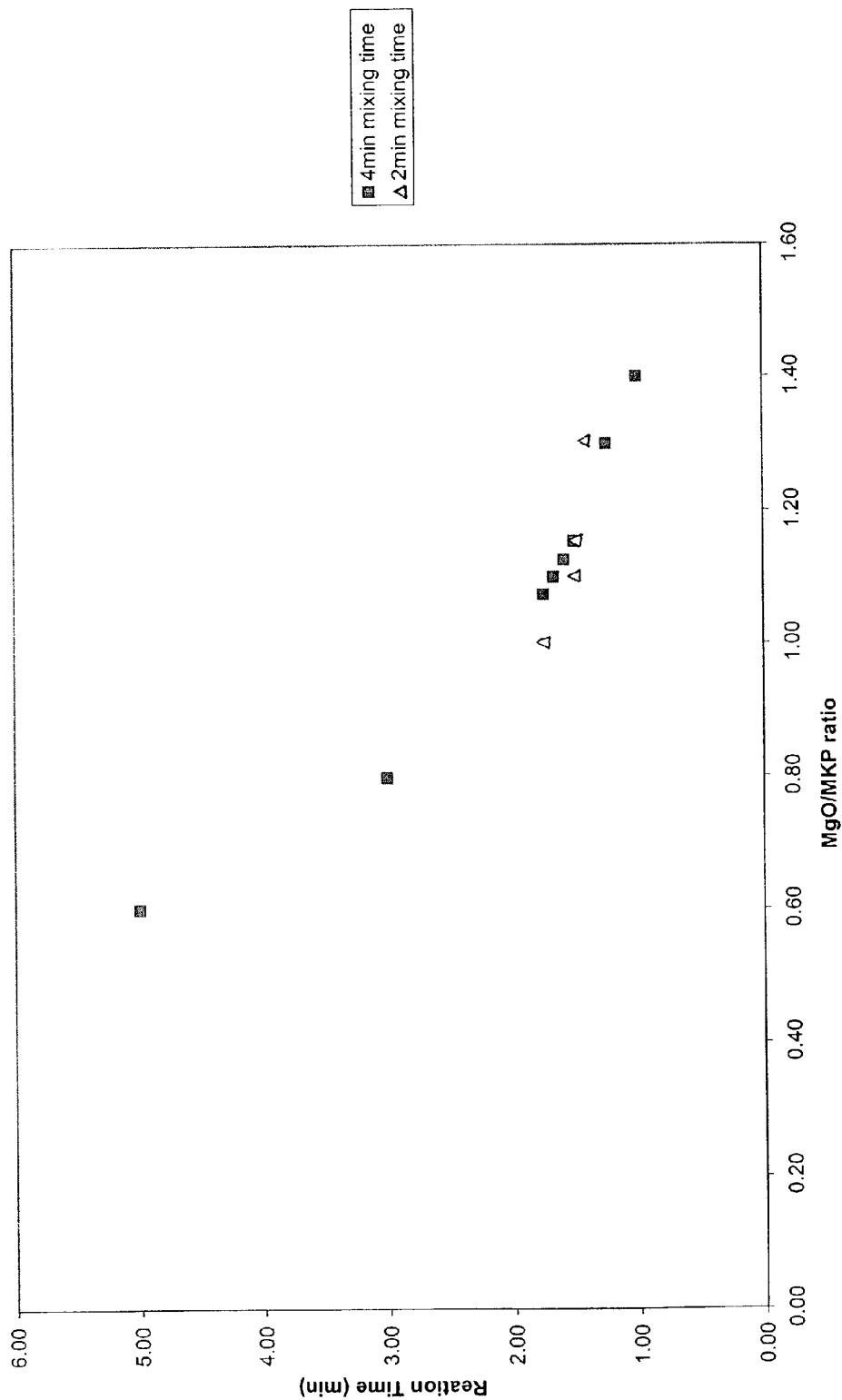
FIG. 2 is a graph of reaction time versus the ratio of magnesium oxide (MgO) to mono-potassium phosphate (MKP) for different samples.
Figure 3:
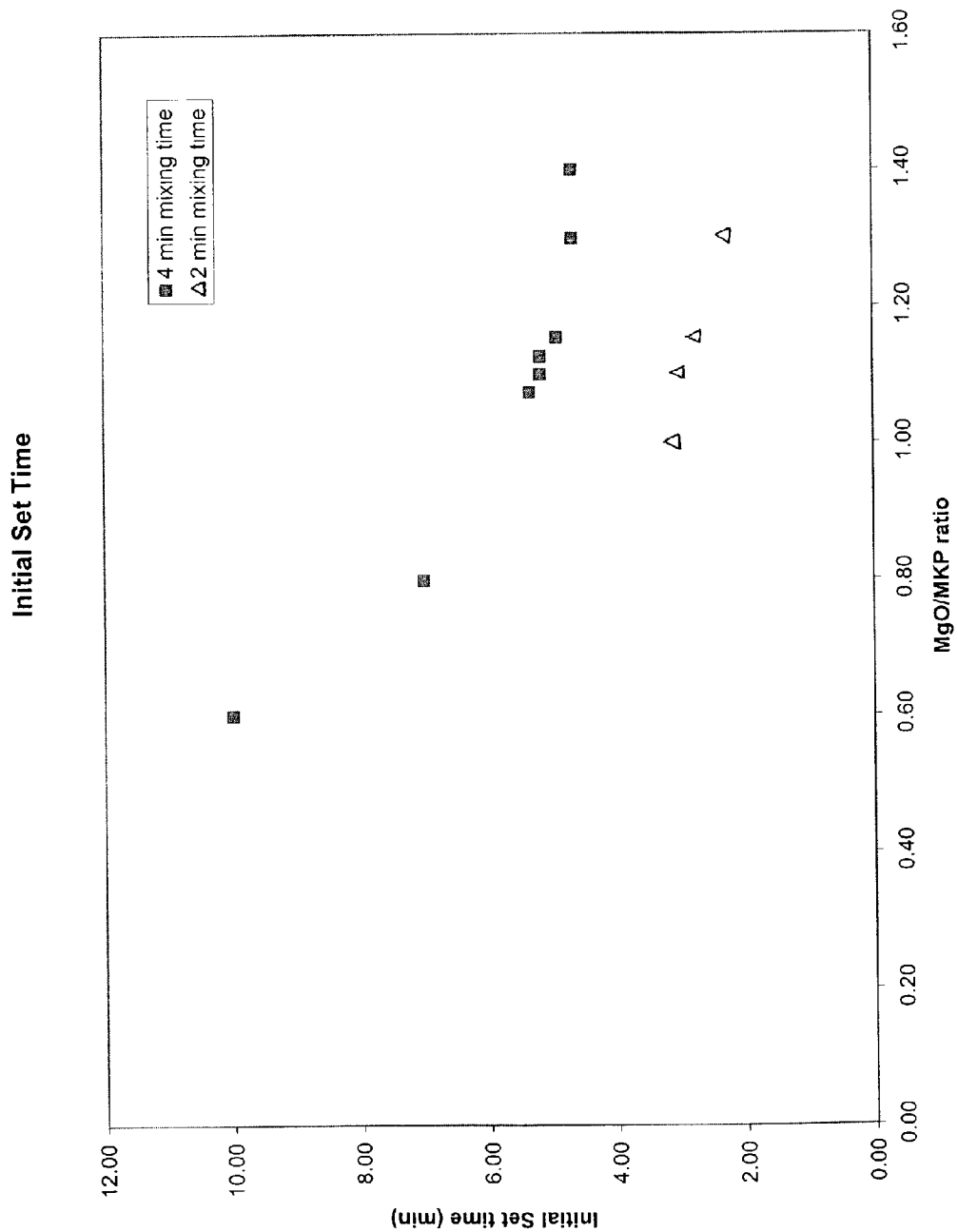
FIG. 3 is a graph of initial set time versus MgO/MKP ratio for several samples.
Figure 4:
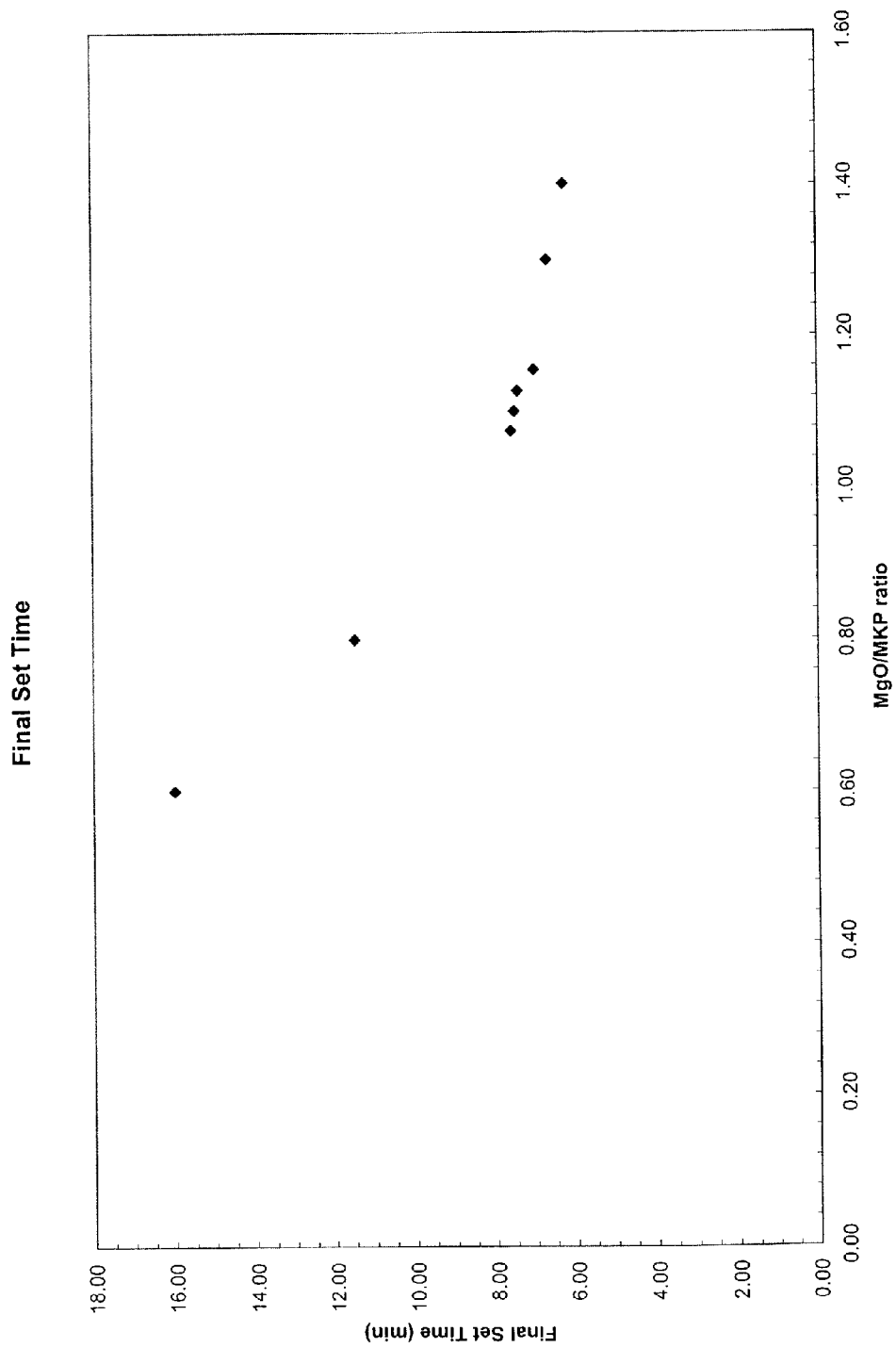
FIG. 4 is a graph of final set time versus MgO/MKP ratio for several samples.
Figure 5:
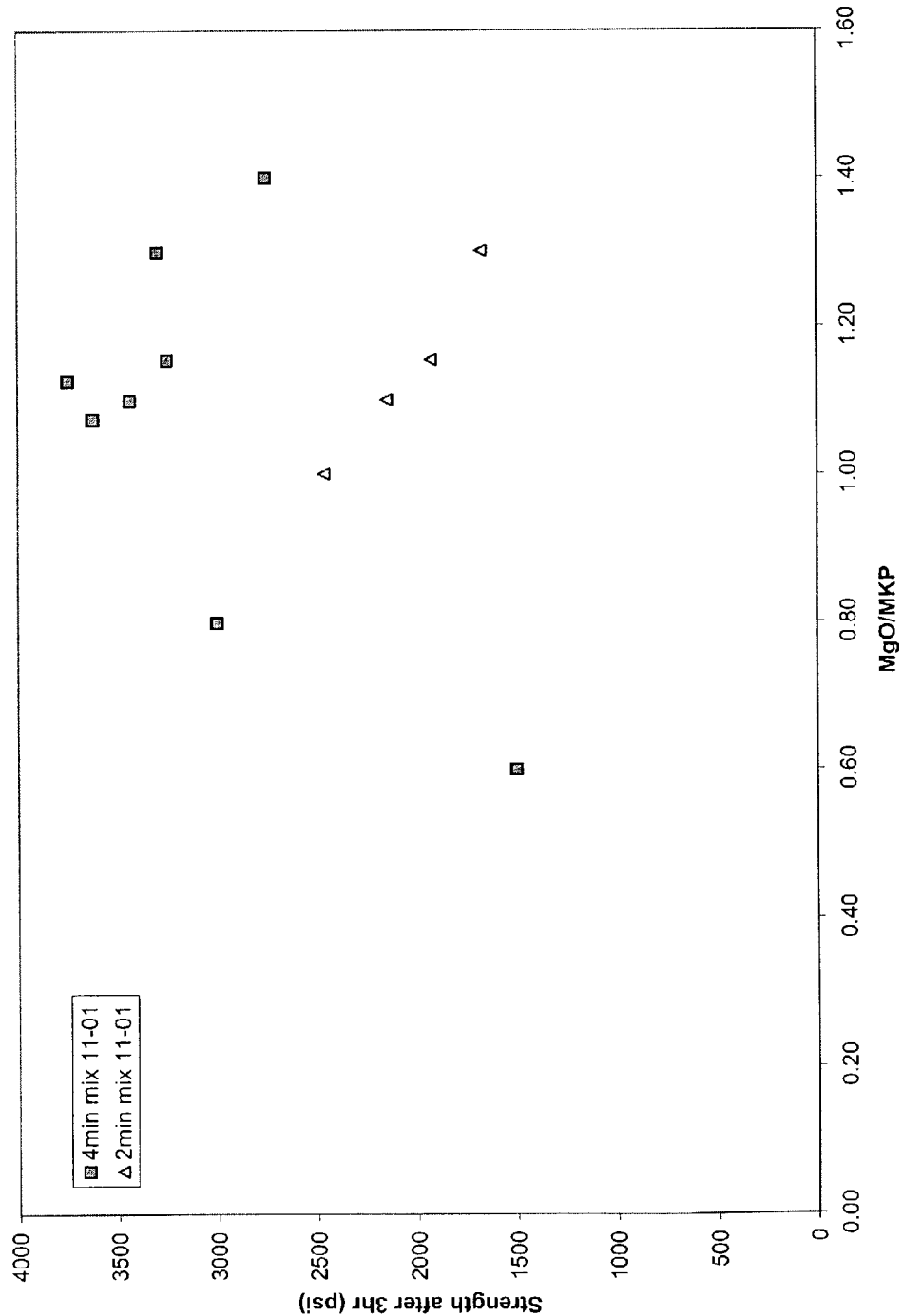
FIG. 5 is a graph of strength after three hours versus MgO/MKP ratio for several samples.

FIG. 2 is a graph of reaction time versus the ratio of magnesium oxide (MgO) to mono-potassium phosphate (MKP) for some of the samples in the foregoing tables. FIG. 3 is a graph of initial set time versus MgO/MKP ratio for the samples. FIG. 4 is a graph of final set time versus MgO/MKP ratio for the samples. FIG. 5 is a graph of strength after three hours versus MgO/MKP ratio for the samples.

The composite materials of the present invention may be made by the selection and blending of properly sized reactants with water (potable and non-potable). During this process both endothermic and exothermic reactions may take place within the composite mixture. In many processes, the composite-forming reaction is exothermic. However, in some cases, at least a portion of the reaction may be endothermic. For example, upon mixing with water, an initial endothermic reaction may take place, followed by an exothermic reaction.

In accordance with the present invention, the composite-forming process may involve relatively short set times. Typical set times in accordance with the present invention are less than about 2 hours, preferably less than about 1 hour. For example, a typical set time of from about 10 to about 90 minutes may be achieved. In contrast, typical set times for Portland cement concrete mixtures may be several hours.

After achieving set, the composite materials of the present invention may possess favorable engineering properties such as high surface hardness, excellent bond to dissimilar materials, capability of expansion and shrinkage, rapid load carrying capability, zero cracking, resistance to spill, better flow and reduced effect from re-tempering. For example, the composite materials may have compressive strengths of at least 500 psi. Compressive strengths of 1,500, 2,000, 2500 or 3,000 psi may be achieved. In some embodiments, compressive strengths of 6,000 psi or higher may be achieved. In addition to relatively high compressive strengths, the present composite materials may exhibit the following improved mechanical properties: zero cracking, resistance to spill, zero shrinkage and better flow. In addition to favorable mechanical properties, the present composite materials may possess improved environmental properties such as non-caustic chemistry, use of non-potable water, high resistance to cyclic freeze-thaw and lower permeability (i.e. resistant to deicing salts).

The composite materials of the present invention may be used for many different applications. Suitable applications include pre-cast structures, in-situ structures, repair materials, very-rapid repair materials, ready mixes, grouts, coatings, counter tops, corrosion inhibitors, thermal barriers, armor, structural composites, anchor bonding materials, medical applications and catalysis. Some examples of pre-cast composite materials include railroad ties, high pressure pipes, retainer walls, railroad slab tracks and crossing platforms, bridge deck preforms, aircraft runway, taxi and apron pre-cast structures, armor panels, casting molds, stamping molds, combustion and combustion product catalysts, housing and building wall panels, countertops, and the like.

Figure 6:
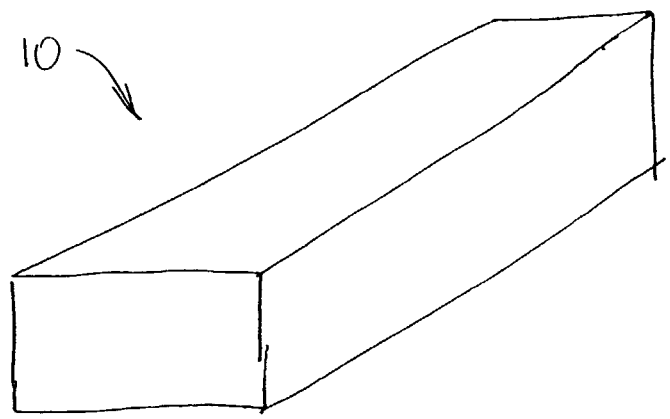
FIG. 6 is an isometric view of a pre-cast railroad tie made of a composite material of the present invention.

A pre-cast railroad tie 10 is illustrated in FIG. 6. The railroad tie 10 may be made in any desired shape and size. Other rail components may be separately mounted on the railroad tie 10, or may be integrally fabricated with the tie. The railroad tie may comprise a monolithic material of the present invention, or may be provided as a graded structure of the material or as a composite structure comprising the material and other components or materials.

Figure 7:
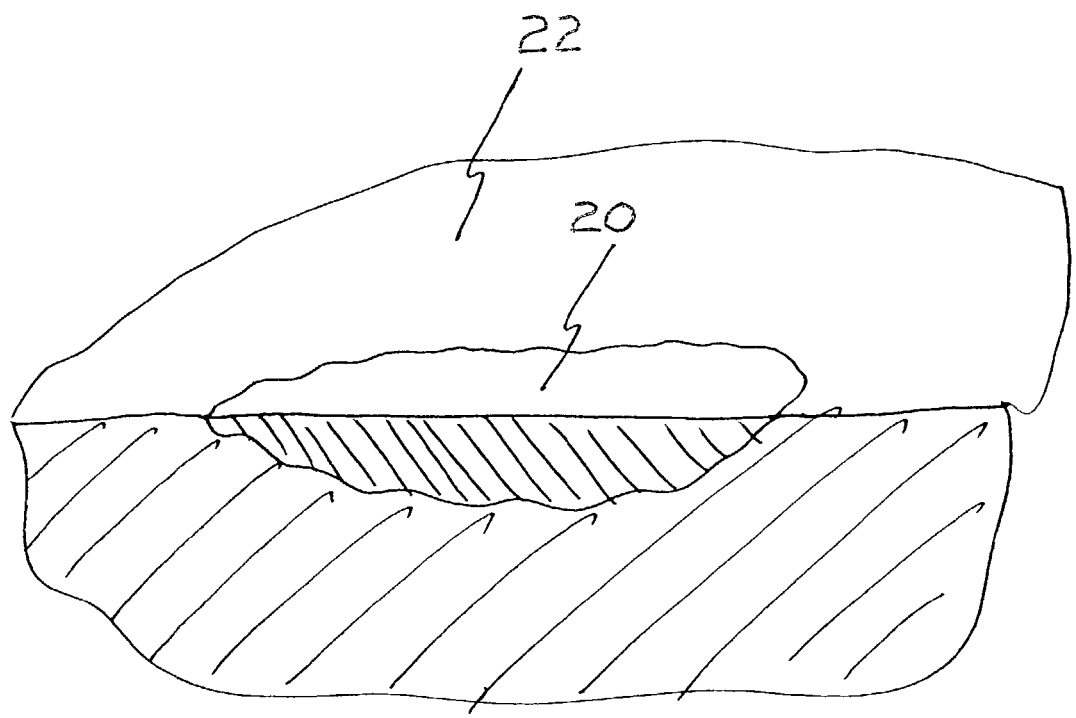
FIG. 7 is an isometric sectional view of a rapid repair material of the present invention.

Typical repair applications include rapid repair of surfaces such as road surfaces, aircraft runways, parking garage decking, building facades, and the like. A rapid repair material 20 in a road or runway surface 22 is illustrated in FIG. 7. The rapid repair material 20 may be made, for example, by mixing the metal oxide, phosphate and reactive residual material with water, followed by placing the material into the hole or crack in the surface 22. In accordance with a preferred embodiment, the rapid repair material 20 sets within 30 minutes, more preferably within 15 or 20 minutes. Upon setting, the rapid repair material may retain the same volume, or may expand slightly, depending upon the compositions used.

Typical in-situ applications include repair of existing concrete materials, e.g., roadways, parking decks, facades, runways, marine applications, vertical columns, grouts, anchor materials, etc. Typical ready mix applications include various types of cast-in-place and pre-cast structures. Typical coatings applications include gunnites, shotcretes, overlaps, sealing membranes, concrete surface treatments, grouts, etc. For medical applications, the present composite materials may be used, for example, to mimic bone structure and morphology.

Whereas particular embodiments of this invention have been described above for purposes of illustration, it will be evident to those skilled in the art that numerous variations of the details of the present invention may be made without departing from the invention.

We claim:

1. A composite material consisting essentially of a reaction product of:
   particulate MgO;
   particulate phosphate comprising mono-potassium phosphate, mono-sodium phosphate, di-potassium phosphate, di-hydrogen potassium phosphate and/or di-ammonium phosphate, wherein the weight ratio of the MgO to the phosphate is from about 1:1 to about 2:1;
   reactive residual material comprising fly ash, municipal waste ash, biosolids ash, volcanic ash, wood ash and/or cellulosic waste ash;
   substantially inert filler; and
   water.

2. The composite material of claim 1, wherein the MgO comprises a mixture of a −30 mesh coarse particle size distribution and a −325 mesh fine particle size distribution, and the weight ratio of the coarse to fine particle size distributions ranges from about 1:100 to about 100:1.

3. The composite material of claim 2, wherein the weight ratio of the coarse to fine particle size distributions ranges from about 1:20 to about 20:1.

4. The composite material of claim 2, wherein the weight ratio of the coarse to fine particle size distributions ranges from about 1:10 to about 10:1.

5. The composite material of claim 1, wherein the MgO comprises a mixture of MgO having different particle size distributions.

6. The composite material of claim 1, wherein the MgO comprises a mixture of MgO having different reactivities.

7. The composite material of claim 1, wherein the MgO comprises dead burned MgO.

8. The composite material of claim 1, wherein the MgO comprises hard burned MgO.

9. The composite material of claim 1, wherein the MgO has a purity of less than 99%.

10. The composite material of claim 1, wherein the MgO has a purity of from about 50 to 98%.

11. The composite material of claim 1, wherein the MgO comprises dead burned −30 mesh MgO.

12. The composite material of claim 1, wherein the MgO comprises dead burned −325 mesh MgO.

13. The composite material of claim 1, wherein the MgO comprises dead burned −30 mesh MgO and dead burned −325 mesh MgO.

14. The composite material of claim 1, wherein the MgO comprises hard burned −60 mesh MgO.

15. The composite material of claim 1, wherein the MgO comprises hard burned −30 mesh MgO.

16. The composite material of claim 1, wherein the phosphate comprises a plurality of phosphate compositions.

17. The composite material of claim 1, wherein the phosphate comprises mono-potassium phosphate.

18. The composite material of claim 1, wherein the phosphate comprises mono-sodium phosphate.

19. The composite material of claim 1, wherein the phosphate has a purity of from about 30 to about 85 weight percent.

20. The composite material of claim 1, wherein the weight ratio of the MgO to the phosphate is from greater than 1.01:1 to about 2:1.

21. The composite material of claim 1, wherein the reactive residual material comprises fly ash, municipal waste ash, biosolids ash and/or volcanic ash.

22. The composite material of claim 1, wherein the reactive residual material comprises from about 5 to about 80 weight percent of the total of the combined MgO, phosphate and reactive residual material.

23. The composite material of claim 1, wherein the reactive residual material comprises from about 15 to about 70 weight percent of the total of the combined MgO, phosphate and reactive residual material.

24. The composite material of claim 1, wherein the reactive residual material comprises from about 20 to about 50 weight percent of the total of the combined MgO, phosphate and reactive residual material.

25. The composite material of claim 1, wherein the reactive residual material comprises phosphate slurry.

26. The composite material of claim 1, wherein the reactive residual material comprises CaO.

27. The composite material of claim 1, wherein the reactive residual material comprises fly ash.

28. The composite material of claim 1, wherein the reactive residual material comprises municipal waste ash.

29. The composite material of claim 1, wherein the reactive residual material comprises a calcium-containing material.

30. The composite material of claim 1, wherein the reactive residual material reacts with the MgO.

31. The composite material of claim 1, wherein the reactive residual material reacts with the phosphate.

32. The composite material of claim 1, wherein the reactive residual material reacts with the MgO and the phosphate.

33. The composite material of claim 1, wherein the composite material has a reaction time of less than about 90 minutes.

34. The composite material of claim 1, wherein the composite material has a reaction time of from about 1 to about 60 minutes.

35. The composite material of claim 1, wherein the composite material has a reaction time of from about 2 to about 30 minutes.

36. The composite material of claim 1, wherein the composite material has an initial set time of from about 1 to about 120 minutes.

37. The composite material of claim 1, wherein the composite material has an initial set time of from about 1.5 to about 45 minutes.

38. The composite material of claim 1, wherein the composite material has an initial set time of from about 2 to about 30 minutes.

39. The composite material of claim 1, wherein the composite material has a final set time of from about 2 to about 180 minutes.

40. The composite material of claim 1, wherein the composite material has a final set time of from about 4 to about 90 minutes.

41. The composite material of claim 1, wherein the composite material has a final set time of from about 5 to about 45 minutes.

42. The composite material of claim 1, wherein the composite material has a compressive strength of at least 1,500 psi.

43. The composite material of claim 1, wherein the composite material has a compressive strength of at least 2,500 psi.

44. The composite material of claim 1, wherein the filler comprises sand, aggregate, fibers, plastic, wood and/or paper.

45. The composite material of claim 1, wherein the filler comprises from about 5 to about 80 weight percent sand.

46. The composite material of claim 1, wherein the composite material further comprises from about 1 to about 25 weight percent fibers.

47. The composite material of claim 46, wherein the fibers comprise metal, polymer, glass and/or graphite.

48. A rapid repair material comprising the composite material of claim 1.

49. The composite material of claim 1, wherein the material is used as a pre-cast structure.

50. The composite material of claim 1, wherein the material is used as an in-situ structure.

51. A coating composition comprising the composite material of claim 1.

52. A grout comprising the composite material of claim 1.

53. An anchor bonding material comprising the composite material of claim 1.

54. A mix for making a composite material, the mix consisting essentially of:
  particulate MgO;
  particulate phosphate comprising mono-potassium phosphate, mono-sodium phosphate, di-potassium phosphate, di-hydrogen potassium phosphate and/or di-ammonium phosphate, wherein the weight ratio of the MgO to the phosphate is from about 1:1 to about 2:1;
  reactive residual material comprising fly ash, municipal waste ash, biosolids ash, volcanic ash, wood ash and/or cellulosic waste ash; and
  substantially inert filler.

55. The mix of claim 54, wherein the MgO comprises a mixture of dead burned MgO and hard burned MgO.

56. The mix of claim 54, wherein the MgO comprises a mixture of a −30 mesh coarse particle size distribution and a −325 mesh fine particle size distribution.

57. The mix of claim 56, wherein the weight ratio of the coarse to fine particle size distributions ranges from about 1:100 to about 100:1.

58. The mix of claim 56, wherein the weight ratio of the coarse to fine particle size distributions ranges from about 1:20 to about 20:1.

59. The mix of claim 56, wherein the weight ratio of the coarse to fine particle size distributions ranges from about 1:10 to about 10:1.

60. The mix of claim 54, wherein the phosphate comprises a plurality of phosphate compositions.

61. The mix of claim 54, wherein the phosphate comprises mono-potassium phosphate, and/or mono-sodium phosphate, and the ash comprises fly ash, municipal waste ash, biosolids ash and/or volcanic ash.

62. The mix of claim 54, wherein the filler comprises sand, aggregate, fibers, plastic, wood and/or paper.

63. The mix of claim 54, wherein the filler comprises from about 5 to about 80 weight percent of the mix.

64. The mix of claim 54, wherein the MgO comprises from about 5 to about 50 weight percent of the mix, the phosphate comprises from about 5 to about 50 weight percent of the mix, and the reactive residual material comprises from about 5 to about 70 weight percent of the mix.

65. The mix of claim 54, wherein the MgO comprises from about 10 to about 40 weight percent of the mix, the phosphate comprises from about 10 to about 40 weight percent of the mix, and the reactive residual material comprises from about 10 to about 50 weight percent of the mix.

66. The mix of claim 54, wherein the MgO comprises from about 20 to about 30 weight percent of the mix, the phosphate comprises from about 20 to about 30 weight percent of the mix, and the reactive residual material comprises from about 15 to about 40 weight percent of the mix.

67. A rapid repair material consisting essentially of a reaction product of:
　particulate MgO;
　particulate phosphate comprising mono-potassium phosphate, mono-sodium phosphate, di-potassium phosphate, di-hydrogen potassium phosphate and/or di-ammonium phosphate, wherein the weight ratio of the MgO to the phosphate is from about 1:1 to about 2:1;
　reactive residual material comprising fly ash, municipal waste ash, biosolids ash, volcanic ash, wood ash and/or cellulosic waste ash;
　substantially inert filler; and
　water.

68. The rapid repair material of claim 67, wherein the phosphate comprises mono-potassium phosphate and/or mono-sodium phosphate, and the reactive residual material comprises fly ash, municipal waste ash, biosolids ash and/or volcanic ash.

69. The rapid repair material of claim 67, wherein the phosphate comprises mono-potassium phosphate.

70. The rapid repair material of claim 69, wherein the reactive residual material comprises fly ash, volcanic ash and/or municipal solid waste ash.

71. The rapid repair material of claim 67, wherein the MgO comprises from about 10 to about 35 weight percent, the phosphate comprises from about 10 to about 35 weight percent, and the reactive residual material comprises from about 15 to about 70 weight percent of the total combined amount of the MgO, phosphate and reactive residual material.

72. The rapid repair material of claim 67, wherein the rapid repair material has an initial set time of less than about 30 minutes.

73. The rapid repair material of claim 67, wherein the rapid repair material has an initial set time of from about 0.1 to about 25 minutes.

74. The rapid repair material of claim 67, wherein the rapid repair material has an initial set time of from about 1 to about 15 minutes.

75. The rapid repair material of claim 67, wherein the rapid repair material has a final set time of less than about 60 minutes.

76. The rapid repair material of claim 67, wherein the rapid repair material has a compressive strength of at least 500 psi.

77. The rapid repair material of claim 67, wherein the rapid repair material has a compressive strength of at least 1,500 psi.

78. The rapid repair material of claim 67, wherein the rapid repair material has a compressive strength of at least 2,000 psi.

79. A method of making a composite material, the method comprising:
　providing a mixture consisting essentially of particulate MgO, particulate phosphate comprising mono-potassium phosphate, mono-sodium phosphate, di-potassium phosphate, di-hydrogen potassium phosphate and/or di-ammonium phosphate, reactive residual material comprising fly ash, municipal waste ash, biosolids ash, volcanic ash, wood ash and/or cellulosic waste ash, and substantially inert filler, wherein the weight ratio of the MgO to the phosphate is from about 1:1 to about 2:1; and
　adding water to the mixture.

80. The method of claim 79, wherein the step of adding water to the mixture is performed by pouring the water into the mixture.

81. The method of claim 79, wherein the step of adding water to the mixture is performed by pouring the mixture into the water.

82. The method of claim 79, wherein water comprises tap water, potable water or seawater.

83. The method of claim 79, wherein the water comprises from about 10 to about 40 weight percent of the mixture.

84. The method of claim 79, wherein the water comprises from about 15 to about 30 weight percent of the mixture.

85. The method of claim 79, wherein the phosphate comprises mono-potassium phosphate and/or mono-sodium phosphate, and the reactive residual material comprises fly ash, municipal waste ash, biosolids ash and/or volcanic ash.

86. The method of claim 79, wherein the MgO comprises from about 5 to about 50 weight percent, the phosphate comprises from about 5 to about 50 weight percent, and the reactive residual material comprises from about 5 to about 70 weight percent of the mixture.

87. The method of claim 79, wherein the composite material has an initial set time of less than about 120 minutes.

88. The method of claim 79, wherein the composite material has an initial set time of from about 1.5 to about 45 minutes.

89. The method of claim 79, wherein the composite material has an initial set time of from about 2 to about 30 minutes.

90. The method of claim 79, wherein the composite material has a final set time of less than about 180 minutes.

91. The method of claim 79, wherein the composite material has a final set time of from about 4 to about 90 minutes.

92. The method of claim 79, wherein the composite material has a final set time of from about 5 to about 45 minutes.

93. The composite material of claim 1, wherein the MgO comprises light burned MgO.

94. The composite material of claim 1, further comprising $CaCl_2$ or $CrCl_3$.

95. The composite material of claim 1, further comprising $MgSO_4$, $Mg(OH)_2$ or $MgCO_3$.

96. The mix of claim 54, wherein the MgO has a purity of from at least 10 to about 99 weight percent.

97. The mix of claim 54, wherein the MgO has a purity of from at least 10 to about 98 weight percent.

98. The mix of claim 54, wherein the phosphate has a purity of from about 30 to about 85 weight percent.

99. The mix of claim 54, further comprising $CaCl_2$ or $CrCl_3$.

100. The mix of claim 54, further comprising $MgSO_4$, $Mg(OH)_2$ or $MgCO_3$.

* * * * *